July 4, 1939.  F. W. GASKINS  2,164,453
COIL SPRING TESTER
Filed Feb. 25, 1937  2 Sheets-Sheet 1
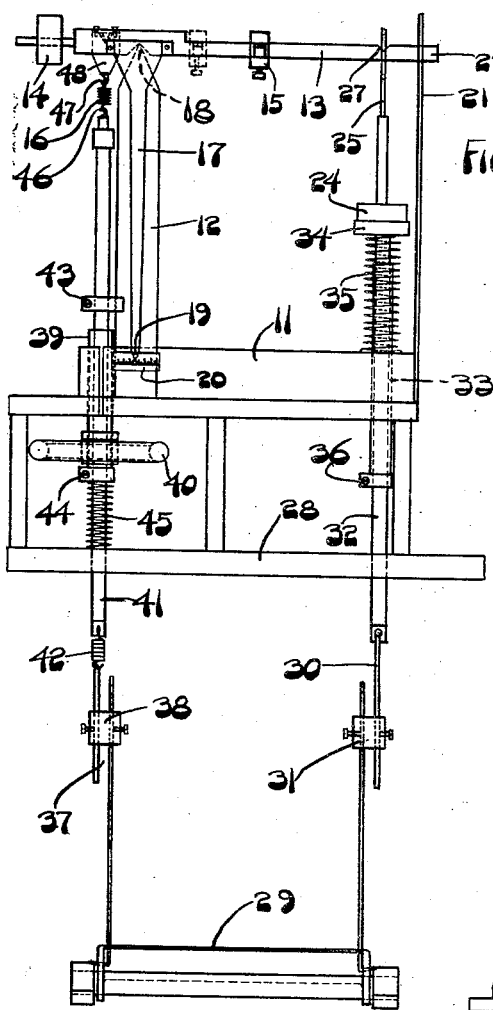
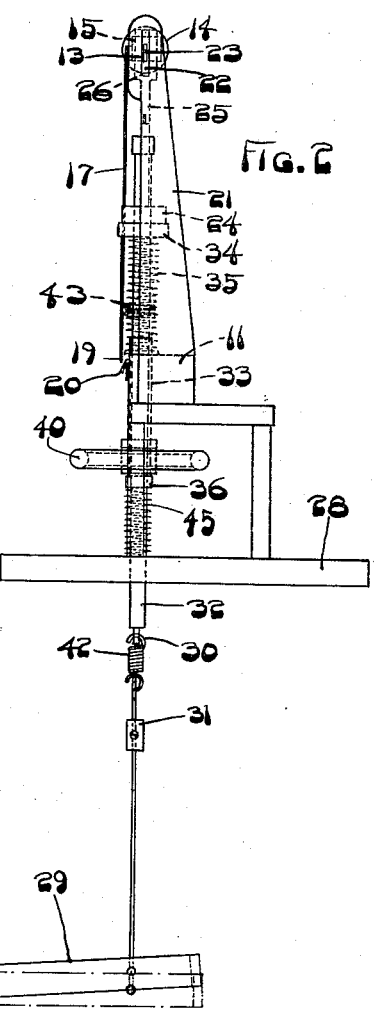
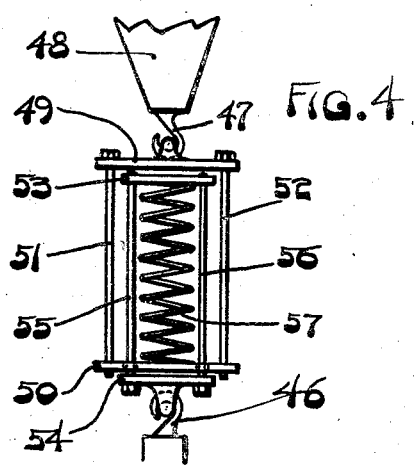
INVENTOR.
Frank W. Gaskins
BY Bogert + Bogert
ATTORNEYS

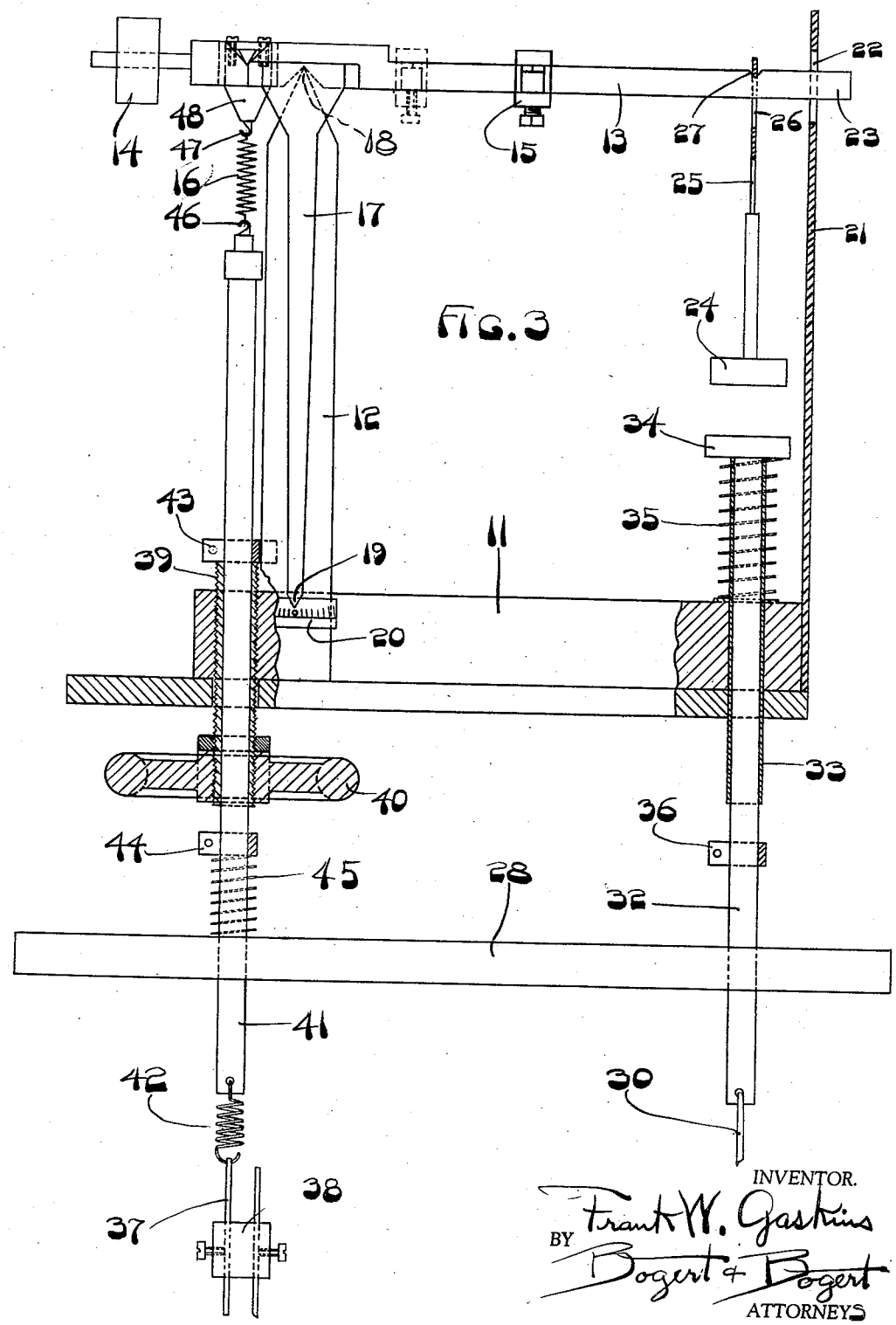

Patented July 4, 1939

2,164,453

UNITED STATES PATENT OFFICE 2,164,453

COIL SPRING TESTER

Frank W. Gaskins, Norwood, Ohio, assignor to The General Spring Company, Cincinnati, Ohio, a corporation of Ohio Application February 25, 1937, Serial No. 127,717

1 Claim. (Cl. 265—16)

The type of spring for the testing of which this machine has been designed, has certain characteristics which are peculiar to it in comparison with springs of other design. A coil spring may be of the open or closed coil type. Open coil springs are those in which spaces have been provided between the coils or convolutions of the springs. Closed coil springs are those in which the convolutions lie against each other. The open coil spring is the usual one designed and employed for use by subjecting the opposite ends of the spring to positive pressures which bring the ends toward each other, whereas, the closed coil spring is primarily designed and employed for use by subjecting the opposite ends of the spring to negative pressures which bring the ends away from each other. The closed coil spring is distinguished from an open coil spring in one particular which is inherently functional in that it is the result of a built-in quality of the spring and has much to do with its performance. I refer to that which is known in the parlance of the designer and manufacturer of such springs as "initial tension". This is the tension or pressure with which adjacent coils hug or press against each other, and it is measured or expressed in terms of the number of ounces, pounds or other unit of measurement required to bring about a separation of the adjacent coils when a tension tending to pull the opposite ends of the springs apart is placed thereon, which separation is commonly known as "breaking" the coils. However, in the measuring or testing of such a closed coil spring, there is one characteristic which may be stated to be in common with an open coil spring. This the designer calls the "rate" of the spring. "Rate" may be said to be the load required to produce one unit measurement of extension or compression of the spring. It is obvious that the amount of initial tension which is introduced in a spring may be one factor in the creation of the total load built into the spring for which the design provides. With this introduction the aims and purposes of my invention may be understood to better advantage.

An object of my invention is to produce a machine for checking or testing the rates of coil springs for the purpose of determining whether such rates are within the limits or tolerances of accuracy.

A further object is to produce a machine for checking or testing the rates of coil springs by providing means to establish limits between which the spring is not only to be tested, but also between which it has been designed to develop its "rate", or, between which it has been designed to function at a designed "rate", or between which it has been designed to function at a designed total load.

These and other objects are attained in the spring tester described in the following specification and illustrated in the acompanying drawings, in which:

Fig. 1 is an elevation showing the testing machine which embodies my invention.

Fig. 2 is a side elevation of the machine shown in Fig. 1.

Fig. 3 is an enlarged view, similar to Fig. 1, but showing certain details of the machine in section in order that its construction and the operation thereof may be understood to better advantage.

Fig. 4 is an elevational view of a detail showing a means for use in the testing of open coil or compression springs.

The testing machine I have shown resembles a beam balance or scale, in that it is provided with a base 11 which has an upright fulcrum 12 upon which a balance arm 13 rests. On one end of the balance arm is an adjustably mounted weight 14 by means of which the arm is given a preliminary balancing, while on the opposite end of the arm is a slidable weight 15 by means of which the arm is balanced when a spring 16 has been placed in position as will be explained. A long and downwardly extending pointer or indicator 17 is attached to the arm, preferably vertically central with the fulcrum point 18 so that the point 19 at the lower end of the indicator will rest, upon proper weight adjustment having been made at the zero (0) mark of a calibration scale 20 at the lower end of the fulcrum upright 12. An upright plate 21 attached to the right hand end of the base 11, is provided with a slot 22 within which and by means of which the end 23 of balance arm 13 moves, is guided and limited in its movement. Near end 23 of the arm 13 the weight 24 is hung by means of a link 25 which is provided with an elongated slot 26, the purpose of which slot will be explained, the link 25 engages a locating notch 27 in the balance arm to assure definite location of the weight when it is supported by the arm.

Beneath a table 28 which supports the structure above described, somewhat as shown, is located a treadle 29 which is employed to place the tester in operation. One side of the treadle is connected with a link 30 which is adjustable at 31 as to length, and is connected with a rod 32 having sliding mounting in a sleeve 33 mounted in the base 11 and at the upper end of which is mounted a platform 34. A spring 35 which is mounted between the platform 34 and the base 11 upon the upper end of the sleeve 33 and the projecting upper end of the rod 32, normally holds the platform elevated so as to lift the weight 24 whereby its link slot frees the balance arm 13, a stop 36 being clamped in proper adjusted position on the rod 32 beneath the sleeve 33 to act as a limit of upward movement for this purpose. The object of this will be described shortly.

At the opposite side of the treadle 29 another adjustable link 37 is attached, a clamp 38 being provided to effect this adjustability. To the left of the fulcrum 12 a sleeve 39 is mounted in the base 11, the sleeve being externally screw threaded so that its position, either up or down, may be adjusted, the purpose of which adjustment will be set forth later. A hand wheel 40 secured to the lower end of the sleeve, facilitates adjustment of the sleeve. Through the sleeve a rod 41 slides, a spring connection 42 attaching the rod to the link 37, the yielding action of which will be utilized for a purpose which will appear herein. On the rod 41 are the respective upper and lower adjustable stops 43 and 44 by means of which the rod is limited in its movement, as is readily seen in referring to the respective Figs. 1 and 3 which show the upper and lower positions of the rod. A spring 45 between the lower stop 44 and the table 28 normally retains the rod in elevated limited position shown in Fig. 1, while by stepping on treadle 29 the rod 41 is moved downwardly, the spring 45 is compressed, the stop 43 is brought to engage the upper end of the sleeve 39, and the spring 42 is stretched to permit treadle 29 to be moved completely to its floor contacting position. On the upper end of rod 41 a hook 46 permits the attachment of the lower end of the spring 16 which is to be tested, while a hook 47 on a lug 48 on the balance arm and to the left of the fulcrum thereof, permits of the attachment of the upper end of the spring to be tested.

I have now described the structure by means of which the testing of closed coil and even open coil springs may be accomplished, and which operation will be described as exemplary of one way in which the tester may be used:

Let it be assumed that the tester is prepared for use by having no spring 16 mounted in place for testing, then in moving weight 15 to the dotted line position shown, and, with the treadle lifted by springs 35 and 45 so that weight 24 is lifted from the arm 13, in adjusting weight 14 so that arm 13 just balances nicely with its pointer 17 at the zero (0) mark on the calibration 20. Then, the spring 16 which is to be tested, is hooked upon hooks 46 and 47. Hand wheel 40 is then moved to draw the sleeve 39 downwardly, which operation takes up the looseness of spring 16 on the hooks and also tends to cause arm 13 to move upwardly on its right hand end, thereby bringing pointer 17 to the right of the zero (0) mark on the scale 20. Weight 15 is now moved to the right until the coils of spring 16 just begins to break. The hand wheel 40 is then adjusted to bring the pointer 17 to the zero mark of the calibration. Since the spring has been designed to expand or stretch a certain prescribed amount when subjected to a specific load, the amount of this stretch or expansion is obtained by loosening stops 44 and 43 and setting 44 to abut the under or lower end of sleeve 39, while stop 43 is set in spaced relation to the upper end of sleeve 39 a distance which is the amount the spring is to stretch when in use and under tension by the load for which it has been designed to function. This load is calculated and embodied in the form of weight 24 which, with the portion of arm 13 which lies to the left of the fulcrum, will be materially reduced in size because of the longer portion lying to the right of the fulcrum, the position of the weight being determined by the arm notch 27. Thus, with everything in readiness, as has been described, the operator's foot being placed on treadle 29 will produce a simultaneous stretching of spring 16 and a removal of platform 34 from beneath weight 24. Since the spring stretch will be the amount for which the spring was designed, the simultaneous removal of weight-supporting platform 34 so that the weight 24 will act, should result in no movement of the pointer, theoretically speaking. However, since there is bound to be some variation in such theoretical conditions, some degree of tolerance or deviation from the actually perfect performance is established. This, having been decided, will be established by the movement to either or both sides of the zero (0) mark, of the pointer. Any springs of a lot which have been made to meet the designed requirements, which react to cause or permit the pointer to move beyond the established limit of tolerance of the pointer movement, would naturally be rejected.

In other words, the principle upon which my tester has been designed to function, is that of coordinating a definite alteration in the length of a spring, with a predetermined load with which the spring has been designed to balance.

The fixture, jig or attachment by means of which the compression springs may be tested, and which is shown in Fig. 4, discloses that a plate 49 which is suspended from hook 47 of the tester, supports a plate 50 through two rods 51 and 52, and by means of which the lower end of the spring 57 is supported, while a plate 54 attached to hook 46, supports a plate 53 by means of two rods 55 and 56.

In this manner opposed movement of the hooks, as when testing tension springs, will create the desired compression of the spring so that it may be tested for "rate" as is done for expansion springs. No change in the tester construction or operation is occasioned, it being merely necessary, if desired, to adjust weight 15 to compensate for the weight of the attachment.

Having thus described my invention what I claim is:

A coil spring tester comprising a base, a fulcrum supported above the base, a balance arm supported on the fulcrum, a pointer on the arm in the region of the fulcrum and extending normal thereto toward the base, a scale on the base associated with the pointer to indicate movement thereof, a weight adjustably mounted on one end of the arm to balance it, means on the arm between the fulcrum and the weight for attachment thereto of one end of the spring to be tested, a spring tensioner extending from the base beneath the spring to be tested, a weight adjustably mounted on the end of the arm opposite to the end mounting the first mentioned weight, whereby adjustment of said second mentioned weight will balance the initial tension of the spring being tested, a third weight placed for support on the arm end carrying the second mentioned weight, a weight lifter beneath the third mentioned weight and normally supporting it from the arm, and coordinating mechanism adapted to operate the tensioner and weight lifter jointly, whereby simultaneously with spring tensioning the third mentioned weight will be placed on the arm, said tensioner having a movement causing the relative movement between the spring ends to be that for which it was designed, said third mentioned weight being proportioned to exert the load on the spring for which it was designed, and whereby upon the spring thusly becoming tensioned simultaneously with the application of the load thereto the pointer should assume a position of rest substantially that of the pre-balanced position of rest established after adjustment of the second mentioned weight.

FRANK W. GASKINS.